United States Patent [19]

Riniker et al.

[11] 3,755,286

[45] Aug. 28, 1973

[54] GLY³-ACHTH-ACTIVE PEPTIDES

[75] Inventors: Bernhard Riniker, Frenkendorf; Werner Rittel, Basel, both of Switzerland

[73] Assignee: Ciba Corporation, Summit, N.J.

[22] Filed: May 5, 1970

[21] Appl. No.: 34,865

Related U.S. Application Data

[63] Continuation-in-part of Ser. No. 781,952, Dec. 6, 1968, abandoned, which is a continuation-in-part of Ser. No. 529,259, Feb. 23, 1966, abandoned.

[30] Foreign Application Priority Data

Feb. 26, 1965 Switzerland.......................... 2676/65

[52] U.S. Cl................ 260/112.5, 424/177, 424/179
[51] Int. Cl....................... C07c 103/52, C07g 7/00
[58] Field of Search................... 260/112.5; 424/179

[56] References Cited
UNITED STATES PATENTS

| 3,228,839 | 1/1966 | Kappeler et al. | 424/179 |
| 3,228,926 | 1/1966 | Kappeler et al. | 260/112.5 |
| 3,352,844 | 11/1967 | Boissonnas et al. | 260/112.5 |
| 3,503,951 | 3/1970 | Iselin et al. | 260/112.5 |

FOREIGN PATENTS OR APPLICATIONS

| 1,492,046 | 7/1967 | France | 260/112.5 |

OTHER PUBLICATIONS

Dixon et al., Biochem. J., 84, 462–468 (1962).
Geiger et al., Z Naturforschg., 19B, 858–860 (1964).
Hedner, Acta Endocrinologica, 43, 499–501 (1963).

*Primary Examiner*—Lewis Gotts
*Assistant Examiner*—Reginald J. Suyat
*Attorney*—Harry Goldsmith, Joseph G. Kolodny and Mario A. Monaco

[57] ABSTRACT

Peptides whose aminoacid sequence differs from that of the ACTH-active peptides containing the first three aminoacids of ACTH in that of the serine residues in 1- and 3-position at least that in 3-position is replaced by glycine. These peptides have a stronger and/or longer lasting ACTH-activity than the corresponding peptides containing the natural first three aminoacids.

8 Claims, No Drawings

GLY³-ACHTH-ACTIVE PEPTIDES

CROSS-REFERENCES TO RELATED APPLICATIONS

This is a continuation-in-part of our copending application Ser. No. 781,952, filed Dec. 6, 1968 which itself is a continuation-in-part of Ser. No. 529,259, filed Feb. 23, 1966, both now abandoned.

DESCRIPTION OF THE PREFERRED EMBODIMENTS

It is known that the peptide chain of $\beta$-corticotropin can be significantly changed, especially on the carboxyl end, without losing the adrenocorticotropic action. Thus, for example, the activity, referred to 1mg of peptide, remains intact (about 100 international units per mg) when splitting off of the aminoacids is carried out from the carboxyl end of natural ACTH up to the 20th aminoacid. Any further splitting off causes a diminution in activity. Thus, $\beta^{1-19}$-corticotropin still possesses about 30% of the ACTH activity, and $\beta$-$^{1-16}$-corticotropin about 1% per mg. At the amino end the first aminoacid, serine¹, could be replaced by glycine (Dixon, Biochem.J.84, page 462 [1962]) without impairing the activity. Other, relatively slight changes cause the activity to diminish. Taking $\beta^{1-23}$-corticotropin-23-amide (which contains about 100 international units per mg and has thus substantially the same activity per mg as natural $\beta$-corticotropin or as $\beta^{1-24}$-corticotropin [cf. U.S.- patents 3,228,839 and 3,228,926]) as a reference substance, it is found that when the first aminoacid, serine¹, is removed, the activity drops to half; when the 3rd aminoacid, serine³, is replaced by alanine, the activity is likewise reduced by 50%, whereas replacement of the 2nd aminoacid, tyrosine, by phenylalanine reduces the activity to 2/3 (cf. Naturf. 19b, pages 858–860 [1964]). In no case has there so far been achieved an increase in activity, referred to 1mg of peptide, over that of natural ACTH by changing the sequence of ACTH.

The present invention is based on the unexpected observation that peptides, whose aminoacid sequence differs from that of the ACTH-active peptides containing the first three aminoacids of ACTH in that of the serine residues in 1 - and 3-position at least that in 3-position is replaced by glycine, have a stronger and/or longer lasting ACTH-activity than the corresponding peptides containing the natural first three aminoacids.

It is another advantage of the new peptides that they are easier and cheaper to synthesize than the corresponding peptides containing the natural $\beta^{1-3}$-corticotropin sequence.

Accordingly, the present invention provides peptides that differ in the aminoacid sequence from ACTH-active peptides containing the first three aminoacids of ACTH in that of the serine residues in 1- and 3-position at least that in 3-position is replaced by glycine, as well as acid addition salts, derivatives and complexes, especially metal complexes such as zinc complexes, of the peptides mentioned and also processes for their manufacture.

The ACTH-active peptides, from which the new peptides differ by the above-mentioned change in sequence according to this invention, are peptides containing at least 16 aminoacids from the amino end of ACTH, for example, peptides containing the first 16-31, especially 20-25, aminoacids of the ACTH-molecule. In these peptides some aminoacids of the natural sequence may have been exchanged for other natural $\alpha$-aminoacids, provided this does not significantly impair the ACTH-activity, as is the case, e.g., when methionine⁴ is exchanged for norvaline, norleucine, leucine or $\alpha$-aminobutyric acid, or above all glutamic acid⁵ for glutamine, or arginine $^{17,18}$ for ornithine$^{17,18}$ or lysine $^{17,18}$.

The following peptides are for instance within the scope of the invention: $Gly^3$-$\beta^{1-(18,19,20,21,22,23,24,25\ or\ 39)}$-corticotropin, $Gly^{1,3}$-$\beta^{1-(18,19,20,21,22,23,24,25,\ or\ 39)}$-corticotropin, $Gly^3$-$Orn^{17,18}$-$\beta^{1-(18,19,20,21,22,23,24,25,\ or\ 39)}$-corticotropin, $Gly^{1,3}$-$Orn^{17,18}$-$\beta^{1-(18,19,20,21,22,23,24,25\ or\ 39)}$-corticotropin $Gly^{1,3}$-$Lys^{17,18}$-$\beta^{1-(18,19,20,21,22,23,24,25\ or\ 39)}$-corticotropin $Gly^3$-$Lys^{17,18}$-$\beta^{1-(18,19,20,21,22,23,24,25\ or\ 39)}$-corticotropin, $Gly^{1,3}$-$Nle^4$-$\beta^{1-(18,19,20,21,22,23,24,25\ or\ 39)}$-corticotropin, $Gly^{1,3}$-$Nva^4$-$\beta^{1-(18,19,20,21,22,23,24,25\ or\ 39)}$-corticotropin, $Gly^{1,3}$-$Nle^4 Lys^{17,18}$-$\beta^{1-(18,19,20,21,22,23,24,25\ or\ 39)}$-corticotropin, $Gly^3$-$Nva^4 Orn^{17,18}$-$\beta^{1-(18,19,20,21,22,23,24,25\ or\ 39)}$-corticotropin, $Gly^{1,3}$-$Abu^4$-$Lys^{17,18}$-$\beta^{1-(18,19,20,21,22,23,24,25\ or\ 39)}$-corticotropin, $Gly^3$-$Gln^5$-$\beta^{1-(18,19,20,21,22,23,24,25\ or\ 39)}$-corticotropin, $Gly^{1,3}$-$Gln^5$-$\beta^{1-(18,19,20,21,\ 22,23,24,25\ or\ 39)}$-corticotropin, $Gly^{1,3}$-$Nle^4$-$Gln^5$-$Orn^{17,18}$-$\beta^{1-(18,19,20,21,22,23,24,25\ or\ 39)}$-corticotropin, $Gly^{1,3}$-$Nle^4$-$Gln^5$-$Lys^{17,18}$-$\beta^{1-(18,19,20,21,22,23,24,25\ or\ 39)}$-corticotropin, $Gly^{1,3}$-$Nva^4$-$Gln^5$-$Lys^{17,18}$-$\beta^{1-(18,19,20,21,22,23,24,25\ or\ 39)}$-corticotropin, $Gly^{1,3}$-$Abu^4$-$Gln^5$-$Orn^{17,18}$-$\beta^{1-(18,19,20,21,22,\ 23,24,25\ or\ 39)}$-corticotropin, $Gly^{1,3}$-$Val^{25}$-$\beta^{1-25}$-corticotropin $Gly^{1,3}$-$Nle^4$-$Val^{25}$-$\beta^{1-25}$-corticotropin, $Gly^{1,3}$-$Nva^4$-$Val^{25}\beta^{1-25}$-corticotropin, $Gly^{1,3}$-$Nle^4$-$Lys^{17,18}$-$Val^{25}$-$\beta^{1-25}$-corticotropin, $Gly^{1,3}$-$Nva^4$-$Gln^5$-$Orn^{17,18}$-$Val^{25}$-$\beta^{1-25}$-corticotropin, $Gly^3$-$Leu^4$-$Lys^{17,18}$-$Val^{25}$-$\beta^{1-25}$-corticotropin, $Gly^3$-$Abu^4$-$Gln^5$-$Val^{25}$-$\beta^{1-25}$-corticotropin, and the C-terminal unsubstituted amides of these compounds.

Particularly suitable acid addition salts are those of therapeutically acceptable acids, such as hydrochloric or acetic acid, or above all sparingly soluble salts, such as sulphates, phosphates of sulphonates.

Suitable derivatives are, e.g., esters, such as lower alkyl esters, for example methyl, ethyl, propyl, tertiary butyl esters, or unsubstituted benzyl esters or benzyl esters substituted, e.g., by nitro groups, halogen atoms, lower alkyl or lower alkoxy groups; furthermore hydrazides an amides, especially peptide amides in which the C-terminal carboxyl group is amidated.

"Complexes" are here intended to mean complex-like compounds whose structure has not so far been explored and which are formed when certain inorganic or organic substances are added to peptides having an adrenocorticotropic action, primarily those which impart a prolonged action to the peptides. Such inorganic substances are compounds derived from metal, such as calcium, magnesium, aluminium, cobalt, and especially zinc, primarily sparingly soluble salts, such as phosphates or pyrophosphates, as well as hydroxides of these metals. Organic substances which prolong the activity of the peptides are, for example, non-antigenic gelatine, for example oxypolygelatine, polyvinyl-pyrrolidone and carboxymethyl cellulose, also sulphonic acid esters, or phosphoric acid esters of alginic acid, dextrin, polyphenols and polyhydric alcohols, above all polyphloretin phosphate and phytinic acid, as well as polymers and copolymers of aminoacids, for example, protamine, and especially of aminoacids containing a preponderance of acid α-aminoacids such as glutamic acid or aspartic acid.

The new compounds, in which at least the serine residue in 3-position, preferably the serine residues in 1-and 3-position, are replaced by glycine possess, as mentioned above, an increased ACTH activity compared with the corresponding compounds containing the natural $\beta^{1-3}$-corticotropin sequence. Accordingly, they are intended for use in human and veterinary medicine, e.g., instead of the natural hormone. Special mentioned with respect to their adrenocorticotropic activity deserve the tetracosapeptide $Gly^{1,3}$-$\beta^{1-24}$-corticotropin, $Gly^{1,3}$-$Orn^{17,18}$-$\beta^{1-24}$-corticotropin and $Gly^{1,3}$-$Lys^{17,18}$-$\beta^{1-24}$-corticotropin and the corresponding peptides that contain in position 5 the glutamine residue instead of the glutamic acid residue.

In the test on hypophysectomized rats in which the increase of corticosterone in the adrenal venous blood by adrenocorticotropically active substances is measured (cf. W. Schuler et al., Schweiz. Medizin. Wochenschrift 93, 1,027–1,03 [1963]) with $Gly^{1,3}$-$\beta^{1-24}$-corticotropin in comparison with $\beta^{1-24}$-corticotropin mentioned above, the effects of i.v. doses of 0.3 µg/kg of $Gly^{1,3}$-$\alpha^{1-24}$-corticotropin show no statistically significant differences compared with those of 1.0 µg/kg of $\beta^{1-24}$-corticotropin.

The new peptides are manufactured by the methods known for the manufacture of peptides having long chains, for example for the manufacture of $\beta^{1-24}$-corticotropin, especially the carbodiimide method the activated ester method the azide method or the mixed anhydride method; the aminoacids are connected in the afore-mentioned sequence either singly or after previous formation of small peptide units. For example, one of the aminoacid or peptide molecules in the form of an ester may be linked with a further aminoacid or peptide molecule containing a protected amino group, in the presence of a condensing agent such as a carbodiimide or of a phosphorous acid ester halide; or the aminoacid ester or peptide ester containing a free amino group may be reacted with an aminoacid or a peptide containing an activated carboxyl group (and a protected amino group), e.g., an acid halide, azide, anhydride, imidazolide, isoxazolide (e.g., from N-ethyl-5-phenylisoxazolium-3'-sulphonate; see Woodward et a, J.Am.Chem.Soc.89, page 1,011[1961] or with an activated ester such as cyanomethyl ester, carboxymethyl-thiol ester or nitrophenyl ester. Conversely, an aminoacid or a peptide containing a free carboxyl group (and a protected amino group) may be reacted with an aminoacid or a peptide containing an activated amino group (and a protected carboxyl group, e.g., a phosphite amide.

Free, functional groups not participating in the reaction are advantageously protected, more especially by means of residues that are easy to eliminate by hydrolysis or reduction, the carboxyl group advantageously by esterification, e.g., with methanol, tertiary butanol, benzyl alcohol, para-nitrobenzyl alcohol, or amidification or the amino group e.g. by introduction of the tosyl, trityl, formyl, trifuloracetyl, phthalyl or carbobenzoxy group or of coloured protective groups such as the para-phenylazo-benzyloxy-carbonyl group or of the para-(para'-methoyl-phenylazo)-benzyloxycarbonyl group, or especially of the tertiary butyloxycarbonyl residue. The nitro group may be used for protecting the amino group in the guanido grouping of arginine;
it is however not absolutely necessary to protect this amino group of arginine during the reaction. The imino group of histidine can, if desired, be protected by the benzyl or the trityl residue.

The conversion of a protected amino or imino group into a free group and the conversion of a functionally modified carboxyl group into a free carboxyl group during the process is performed by known methods by treatment with a hydrolyzing or reducing agent.

According to a preferred process the tripeptide containing the first three aminoacids according to this invention, especially H-Gly-Tyr-Gly-OH, or the tetrapeptide which further contains methionine[4], is condensed with the heptapeptide or hexapeptide of the following aminoacids up to aminoacid[10], preferably by the azide method, whereupon the decapeptide is condensed with the whole of the remaining peptide sequence, that is to say, for example, in the case of the hexadecapeptide with the hexapeptide of aminoacids 11–16, the nonadecapeptide with the nonapeptide of aminoacids 11–19, the eicosapeptide with the decapeptide of aminoacids 11–20, the heneicosapeptide with the undecapeptide of aminoacids 11–21, the docosapeptide with the dodecapeptide of aminoacids 11–12, the tricosapeptide with the tridecapeptide of aminoacids 11–23, the tetracosapeptide with the tetradecapeptide of aminoacids 11–24, the pentacosapeptide with the pentadecapeptide of aminoacids 11–25, the octacosapeptide with the octadecapeptide of aminoacids 11–28, the hentriacontapeptide with the heneicosapeptide of aminoacids 11–31 or with the corresponding peptides having a constitution differing as to the kind of some aminoacid residues from the natural ACTH-sequence.

A preferred coupling method used in the aforementioned condensation is the carbodiimide method or the method of the activated esters, primarily with the use of para-nitrophenyl ester. In the latter case the para-nitrophenyl ester of the decapeptide need not be isolated as such but can be formed in the actual condensation stage from the decapeptide containing a free carboxyl group, paranitrophenol and dicyclophexyl carbodimmide. Thus, the decapeptide is in the form of the α-amino-protected peptide containing a free carboxyl group or dicyclohexyl carbodiimide. ester group. The α-amino group of the decapeptide is preferably protected by the tertiary butyloxycarbonyl group. In the peptide fraction which is condensed with the decapeptide, the terminal carboxyl group is preferably in the form of the tertiary butyl ester group or of an amide group. The sidechain amino groups present in the peptide fractions to be condensed are preferably protected by the tertiary butyloxycarbonyl group, and the sidechain carboxyl groups by the tertiary butyl ester group. These protective groups can be eliminated with trifluoroacetic acid in the last stage of the process.

According to a further process the tetrapeptide containing the first four aminoacids, above all H-Gly-Tyr-Gly-Met-OH, is condensed with the whole of the remaining peptide sequence, that is to say, for example, in the manufacture of the nonadecapeptide with the pentadecapeptide of aminoacids 5–19, the eicosapeptide with the hexadecapeptide of aminoacids 5–20, the heneicosapeptide with the heptadecapeptide of aminoacids 5–21, the docosapeptide with the octadecapeptide of aminoacids 5–22, the tricosapeptide with the nonadecapeptide of aminoacids 5–23, the tetracosapeptide with the eicosapeptide of aminoacids 5–24, the pentacosapeptide with the heneicosapeptide of aminoacids 5–25 and so on, or with the corresponding peptides in which the sequence of the individual aminoacids has been changed.

The coupling in the above condensation is preferably performed by the azide method. The α-amino group of the tetrapeptide hydrazide or azide is preferably protected by the tertiary butyloxycarbonyl group. The peptide, which is condensed with the tetrapeptide, may be the free peptide or an ester, especially the tertiary butyl ester, or the ω-amide. In this peptide the amino groups of the side-chain are advantageously protected by the tertiary butyloxycarbonyl group, and any carboxyl group of the side-chain by the tertiary butyl ester group.

To obtain the above-mentioned tetracosapeptides, for example, the decapeptide of the formula glycyl-L-tyrosyl-glycyl-L-methionyl-L-glutamyl (or L-glutaminyl)-L-histidyl-L-phenylalanyl-L-arginyl-L-tryptophyl-glycine, in which the α-amino group of glycyl and the γ-carboxyl group of glutamyl are protected, may be condensed with an ester of the tetradecapeptide of the formula L-lysyl-L-prolyl-L-valyl-glycyl-L-lysyl-L-lysyl-L-arginyl (or L-ornithyl or L-lysyl)-L-arginyl (or L-ornithyl or L-lysyl)-L-prolyl-L-valyl-L11-lysyl-L-valyl-L-tyrosyl-L-proline, in which the amino groups of the side-chain are protected, for example, by the carbodiimide method or by the method of the activated esters, for example with the paranitrophenylester of the decapeptide, whereupon the protective groups are eliminated from the resulting tetracosapeptide derivative. Protective groups preferably used for the α-amino group of glycine and the amino groups of the side-chain of lysine and possibly ornithine residues are the tertiary butyloxycarbonyl group, whereas the γ-carboxyl group of glutamic acid and the terminal carboxyl group of proline is advantageously protected by the tertiary butyl ester group. All these protective groups can be eliminated simultaneously by the acid hydrolysis, for example with trifluoroacetic acid. The decapeptide can be manufactured by the process described in U.S. Pat. No. 3,256,526 of R. Schwyzer et al., and in application No. 343,228 filed on Feb. 7, 1964 by R. Schwyzer et al., now abandoned, by condensing the tripeptide of the aminoacids 1–3 with the heptapeptide of the aminoacids 4–10, or the tetrapeptide of the aminoacids 1–4 with the hexapeptide of the aminoacids 5–10, for example by the azide method.

The tetradecapeptide ester can be manufactured, for example, by the process of U.S. Pat. No. 3,228,926 and U.S. Pat. No. 3,345,354 of H. Kappeler et al. Instead of the proline tertiary butyl ester there may be used in the above process the prolinamide; in this case the tetracosapeptide-ω-amide is obtained. When instead of the tertiary butyl ester of proline another lower alkyl ester or benzyl ester is used, the corresponding tetracosapeptide lower alkyl or benzyl esters respectively are obtained. The methyl ester can be converted, for example, in known manner by means of hydrazine hydrate into the hydrazide.

According to another method for the manufacture of the tetracosapeptide the tetrapeptide glycyl-L-tyrosyl-glycyl-L-methionine, in which the α-amino group of glycine is protected, for example by the tertiary bytyloxycarbonyl group, may be condensed with the eicosapeptide L-glutamyl (or L-glutaminyl)-L-histidyl-L-phenylalanyl-L-arginyl-L-tryptophyl-glycyl-L-lysyl-L-prolyl-L-valyl-glycyl-L-lysyl-L-lysyl-L-arginyl (or L-ornithyl or L-lysyl)-L-arginyl (or L-ornithyl or L-lysyl)-L-prolyl-L-valyl-L-lysyl-L-valyl-L-tyrosyl-L-proline in which the amino groups of the side chain are protected, for example by the tertiary butyloxycarbonyl group, and in which the γ-carboxyl group of glutamic acid may be esterified, for example by the tertiary butyl ester group, preferably by the azide method. The eicosapeptide derivative containing the protective groups mentioned above is obtained, for example, by condensing carbobenzoxy-(γ-tert.-butyl)-L-glutamyl-L-histidyl-L-phenylalanyl-L-arginyl-L-tryptophyl-glycine with the tritosylate of the tetradecapeptide derivative N$^\epsilon$-tert.-butyloxycarbonyl-L-lysyl-L-prolyl-L-valyl-glycyl-tert.-butyloxycarbonyl-L-lysyl-tert.-butyloxycarbonyl-L-lysyl-L-arginyl-(or tert.-butyloxycarbonyl-L-ornithyl or -L-lysyl)-L-arginyl-(or tert.-butyloxycarbonyl-L-ornithyl or -L-lysyl)-L-prolyl-L-valyl-tert.-butyloxycarbonyl-L-lysyl-L-valyl-L-tyrosyl-L-proline-tert.-butyl ester and eliminating the carbobenzoxy group hydrogenolytically.

The invention includes also any variant of the process in which an intermediate obtained at any stage of the process is used as starting material and the remaining steps are carried out, as well as the intermediates thus obtained.

Depending on the reaction conditions used the new compounds are obtained in the form of bases or of their salts. The bases can be isolated from the salts in known manner. When the bases are reacted with acids capable of forming therapeutically acceptable salts, they yield salts, e.g., those with inorganic acids such as hydrohalic acids, e.g., hydrochloric or hydrobromic acid, perchloric, nitric or thiocyanic acid, sulphuric or phosphoric acids, or organic acids such as formic, acetic, propionic, glycollic, lactic, pyruvic, oxalic, malonic, succinic, maleic, furamic, malic, tartaric, citric, ascorbic, hydroxymaleic, dihydroxymaleic, benezoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, methanesulphonic, ethanesulphonic, hydroxyethanesulphonic, benezenesulphonic, paratoluenesulphonic, naphthalenesulphonic or sulphanilic acid.

The peptides obtained by the present process may be used in the form of pharmaceutical preparations which contain the peptides in admixture or conjunction with an organic or inorganic pharmaceutical excipient suitable for enteral or parenteral administration. Suitable excipients are substances that do not react with the polypeptides, e.g., gelatin, lactose, glucose, sodium chloride, starches, magnesium stearate, talcum, vegetable oils, benzyl alcohols, gums, polyalkyleneglycols, white petroleum jelly, cholesterol or other known medicinal excipients. The pharmaceutical preparations may be lyophilizates, or in liquid form solutions, suspensions or emulsions. If desired, they may be sterilized and/or contain assistants such as preserving, stabilizing, wetting or emulsifying agents. They may also contain further therapeutically valuable substances.

Inter alia, they may be combined with the additives conventionally used in ACTH-therapy for extending the activity, e.g., oxypolygelatin, polyphloretin phosphate, carboxymethyl cellulose, or the above-mentioned sparingly soluble metal compounds, especially phosphates, pyrophosphates or hydroxides of zinc.

For therapeutical purposes there are administered for example solutions or suspensions containing 0.1 to 3 mg/ml of the active peptide, the dosis being 1 ml one to seven times per week i.w. or s.c.

The activity of the new peptides can be prolonged by converting the peptides into their complexes with polymers or copolymers of aminoacids, especially those that have a preponderance of acid α-aminoacids, such as glutamic acid or aspartic acid of the L-, D-, or D,L-configuration. The polymers and copolymers mentioned have free carboxylic groups in their side-chains whereas the terminal carboxyl group may be free or functionally converted, for example, an ester group or an unsubstituted amide group or an amide group substituted by hydrocarbon residues, primarily lower alkyl groups. The molecular weight of the polymers may be between 1,000 and 100,000, preferably 2,000–15,000. It is advantageous to use for the manufacture of the polyaminoacid preparations a water-soluble, physiologically tolerable salt, for example, the sodium or ammonium salt or a salt with an organic base, such as triethylamine, procain, dibenzylamine, or other tertiary nitrogen bases.

The aminoacid polymers are known or can be prepared by a known process, for example, by that described by M. Idelson et al, J.A. Chem. Soc. 80, 4631 et seq. 1958). Thus, for example, glutamic acid-α-carboxylic anhydride-γ-benzyl ester or -tertiary butyl ester may be caused to react in dioxane with ammonia or an amine in a certain molecular ratio, for example 100:1 (depending on the desired degree of polymerization), and the protective groups split off when polymerization is complete, for example, the benzyloxy group with hydrogen bromide in glacial acetic acid, the tertiary butyloxy group with trifluoracetic acid. To obtain polymers with a uniform, defined chain length, the polymers can be synthesized by the methods known in peptide chemistry (carbodiimide method, azide method, activated ester method etc.).

The concentration of the polymers in the pharmaceutical preparations depends on the solubility of the salt concerned and on the viscosity of the polymer. The polymer should be present in the preparations in the dissolved state and it should be injectable.

The concentration of the adrenocorticotropically active peptide is so chosen that the preparation contains, for example, 10–100 international units.

The following Examples illustrate the invention.

The following systems were used in thin-layer chromatography:
System 43A : tertiary amyl alcohol + isopropanol + water (100 : 40 : 10)
System 43C : tertiary amyl alcohol + isopropanol + water (100 : 40 : 55)
System 52 : n-butanol + glacial acetic acid + water (100 : 10 : 30)
System 100 : ethyl acetate + pyridine + glacial acetic acid + water (62 : 21 : 6 : 11)
System 101 : n-butanol + pyridine : glacial acetic acid + water ((30 : 20 : 6 : 24)
System 110 : ethyl acetate + n-butanol + pyridine + glacial acetic acid + water (80 : 40 : 40 : 12 : 19).

The following abbrevations are used:
Z = carbobenzoxy
BOC = tertiary butyloxycarbonyl
tBu = tertiary butyl

EXAMPLE 1

1. BOC-Tyr-Gly-OCH-BOC-Try-Gly-OCH₃

10.12g of BOC-tyrosine are dissolved with heating in 45ml of ethyl acetate, then cooled to 20°C, and mixed with a solution of 3.84g of glycine methyl ester in 10ml of ethyl acetate. 10.4g of Solid dicyclohexyl carbodiimide are then added and the batch is stirred for 18 hours at 25°C and then cooled to 0°C. After 30 minutes the precipitated dicyclohexylurea is filtered off, and the filtrate concentrated, and by precipation with petroleum ether the crude dipeptide derivative is obtained as an amorphous, viscid mass; it is purified by another precipitation from ethyl acetate + petroleum ether and can then be crystallized from the same solvent mixture, whereupon it melts at 124° to 125°C.

The following Rf values are obtained in the thin-layer chromatogram on silica gel:
$R_f$ (43 A) = 0.65
$R_f$ ($CHCl_3$-methanol = 8:2)= 0.68
$R_f$ (101) = 0.77.

2. H-Tyr-Gly-OCH₃ hydrochloride 2g of BOC-Tyr-Gly-OCH₃ are dissolved with heating in 20ml of absolute ethyl acetate and at 20°C mixed with 20ml of 4N-hydrochloric acid in absolute ethyl acetate. After a few minutes a precipitate begins to form. After 30 minutes the reaction mixture is concentrated under vacuum to a volume of about 10ml, and the precipitation of the dipeptide ester hydrochloride is completed by adding 50ml of petroleum ether. The batch is homogenized, the amorphous product filtered off, washed with petroleum ether and dried in a high vacuum at 30°C. The dipeptide ester hydrochloride is obtained as a hydroscopic powder melting at about 110° to 115°C with decomposition. In the thin-layer chromatogram on silica gel it reveals the following $R_f$ values:
$R_f$ (43 A) = 0.33
$R_f$ ($CHCl_3$-methanol = 8:2) = 0.36
$R_f$ (101) = 0.60.

3. BOC-Gly-Tyr-Gly-OCH₃

2.74g of BOC-Gly-OH and 2.18ml of triethylamine are dissolved in 30ml of absolute tetrahydrofuran, then cooled to −10°C, and in the course of 3 minutes a solution of 1.99ml of isobutylchlorocarbonate in 5ml of absolute tetrahydrofuran is dropped in. The batch is stirred on for 10 minutes at +10°C, 4.3g of solid H-Tyr-Gly-OCH₃.HCl are added, then rinsed with 10ml of absolute tetrahydrofuran, and in the course of 5 minutes 2.6ml of triethylamine are dropped in at +10°C. The batch is stirred on for one hour at 0°C and then for one hour at 20°C, filtered, and the filtrate is evaporated to dryness. The amorphous residue is dissolved with heating in 15ml of ethyl acetate, and the protected crude tripeptide is precipitated from it with 50 ml of petroleum ether in the form of a smeary mass. On drying in a high vacuum an amorphous powder is obtained which is purified by multiplicative distribution in the solvent system ethyl acetate+benzene+water+methanol (2 : 3 : 3 : 2) according to Craig (phase volumes 25ml each). After 150 steps the tripeptide derivative is isolated as a compound which is unitary in the thin-layer chromatogram from the distribution fractions 43 to 72 ($r_{max}$ = 60, K = 0.67); it can be recrystallized from aqueous methanol and melts at 153° to 154°C. In the thin-layer chromatogram on silica gel it reveals the following $R_f$ values:

$R_f$ (43 C) = 0.64
$R_f$ (52) = 0.81
$R_f$ (100) = 0.88.

4. BOC-Gly-Tyr-Gly-OH

A solution of 2.05g of BOC-Gly-Tyr-Gly-OCH$_3$ in 10ml of 90% methanol is mixed with 11ml of N-sodium hydroxide solution and then kept for 20 minutes at room temperature, neutralized by means of 11ml of N-hydrochloric acid, and the clear solution is concentrated to about 5ml. The batch is extracted with 3 × 60ml of water-saturated ethyl acetate, dried over sodium sulphate and evaporated to dryness. The pure protected tripeptide is obtained by one crystallization of the residue from methanol+ethyl acetate+petroleum ether and melts at 186° to 187°C with decomposition. In the thin-layer chromatogram on silica gel the compound reveals the following $R_f$ values:

$R_f$ (43 C) = 0.30
$R_f$ (52) = 0.68
$R_f$ (100) = 0.42.

5. BOC-Gly-Tyr-Gly-Met-OCH$_3$ 1.075g of BOC-Gly-Tyr-Gly-OH and 0.652g of H-Met-OCH$_3$.HCl are finely powdered and suspended in a solution of 0.456ml of triethylamine in 15ml of absolute ethyl acetate. 0.785g of Solid dicyclohexyl carbodiimide are then added and the batch is stirred for 30 minutes at 0°C and then overnight at room temperature. The precipitate formed is filtered off (mixture of dicyclohexylurea and triethylamine hydrochloride), the filtrate concentrated to about 5ml, and the crude product is precipitated with 50ml of petroleum ether as a smeary substance. It is reprecipitated twice from ethyl acetate+petroleum ether and once from methanol+water, to yield the chromatographically pure, amorphous, protected tetrapeptide ester which reveals in the thin-layer chromatogram on silica gel the following $R_f$ values:

$R_f$ (43 C) = 0.68
$R_f$ (52) = 0.87
$R_f$ (100) = 0.93.

6. BOC-Gly-Tyr-Gly-Met-NH-NH$_2$

1ml of Hydrazine hydrate is added to a solution of 1g of BOC-Gly-Tyr-Gly-Met-OCH$_3$ in 10ml of methanol, and the solution is kept for 16 hours at room temperature under nitrogen, then evaporated to dryness, 10ml of water are added and the whole is extracted with 70ml of n-butanol. The butanol phase is washed with 5 × 5ml of water, evaporated to dryness, the residue powdered and dried in a high vacuum at 45°C. The resulting crude product is dissolved in 15ml of methanol, mixed with 10ml of ethyl acetate and 60ml of petroleum ether, and kept overnight at 0°C, to yield a gelatinous precipitate which is filtered off and dried in a high vacuum at 45°C. The protected tetrapeptide hydrazide is an amorphous, chromatographically unitary, white powder melting at 146° to 148°C; in the thin-layer chromatogram on silica gel it reveals the following $R_f$ values:

$R_f$ (43 C) = 0.57
$R_f$ (52) = 0.67
$R_f$ (100) = 0.75.

7. Z-Glu(OtBu)-His-Phe-Arg-Try-Gly-Lys(BOC)-Pro-Val-Gly-Lys-(BOC)-Lys(BOC)-Arg-Arg-Pro-Val-Lys(BOC)-Val-Tyr-Pro-OtBu triacetate 625mg (0.273 Millimol) of H-Lys(BOC)-Pro-Val-Gly-Lys (BOC)-Lys(BOC)-Arg-Arg-Pro-Val-Lys(BOC)-Val-Tyr-Pro-OtBu, 3CH$_3$COOH [prepared as described in U.S. Pat. No. 3,228,926 of H. Kappeler et al.], in 10ml of anhydrous pyridine are mixed with 0.17g of para-toluenesulphonic acid. The solution is evaporated to dryness, the residue is freed in a vacuum of 0.01mm Hg at 35°C from pyridine acetate and the pyridine tosylate is removed by trituration with acetone and suction-filtering, to yield 726mg of protected tetradecapeptide tritosylate as a colourless powder melting at 155° to 162°C.

525mg (0.2 Millimol) of the tritosylate and 245mg (0.24 millimol) of Z-Glu-(OtBu)-His-Phe-Arg-Try-Gly-OH [obtained by condensing Z-Arg-OH with H-Try-Gly-OCH$_3$, eliminating the carbobenzoxy group from the tripeptide derivative, condensing the free tripeptide ester with Z-Phe-OH, eliminating the carbobenzoxy group from the tetrapeptide ester, condensing the free tetrapeptide ester with Z-Glu(OtBu)-His-N$_3$ and hydrolyzing the methyl ester group with N-sodium hydroxide solution in 75% dioxane] are dissolved at 50°C with stirring in 4ml of 80% pyridine; 52mg (0.25 millimol) of dicyclohexyl carbodiimide are then added to the clear solution. After 20 hours at 50°C the slightly turbid solution is cooled to 10°C and the precipitated dicyclohexylurea filtered off. A large amount of ether is then added to the solution, whereupon the tritosylate of the eicosapeptide settles out; it is separated, dissolved in 10ml of 60% methanol and chromatographed through a column of 4ml of Amberlite IRA-400 (acetate form). The eluate is evaporated under vacuum and triturated with ether, to yield 650mg of crude protected eicosapeptide ester triacetate which reveals the following $R_f$ values in the thin-layer chromatogram:

on alumina: $R_f$ (100) = 0.34
on silica gel: $R_f$(101) = 0.76; $R_f$ (110) = 0.45.

Developed with Reindel-Hoppe, Pauly and Ehrlich reagents. In addition, unreacted hexapeptide derivative and tetradecapeptide derivative and several faster travelling by-products can be identified.

8. Glu(OtBu)-His-Phe-Arg-Try-Gly-Lys(BOC)-Pro-Val-Gly-Lys(BOC)-Lys(BOC)-Arg-Arg-Pro-Val-Lys(BOC)-Val-Tyr-Pro-OtBu tetraacetate A solution of 600mg of the crude eicosapeptide derivative in 10ml of methanol is hydrogenated overnight in the presence of 0.5ml of glacial acetic acid and 1g of palladium charcoal (10%). The catalyst is then filtered off and the filtrate evaporated in vacuo. The resulting decarbobenzoxylated product is dissolved in 10ml of a 1:1-mixture of tertiary butanol and water and chromatographed on a column of 6g of carboxymethyl cellulose with the use of a gradient between 100ml of 50% tertiary butanol+glacial acetic acid (9:1). Those fractions which according to the thin-layer chromatogram contain unitary eicosapeptide derivative are combined and evaporated under vacuum. The protected eicosapeptide ester tetraacetate reveals on silica gel the following $R_f$ values: (54) = 0.50, (101) = 0.68, (110) = 0.12.

After elimination of all protective groups with 90% trifluoroacetic acid the free eicosapeptide reveals the following $R_f$ values:

$R_f$ (101) on silica gel: 0.25
$R_f$ (101) on alumina: 0.30.

9. BOC-Gly-Tyr-Gly-Met-Glu(OtBu)-His-Phe-Arg-Try-Gly--Lys(BOC)-Pro-Val-Gly-Lys(BOC)-Lys(BOC)-Arg-Arg-Pro-Val-Lys(BOC)-Val-Tyr-Pro-OtBu

A solution of 810mg of BOC-Gly-Tyr-Gly-Met-NHNH$_2$ in in 8.1ml of absolute dimethylformamide is mixed at −15°C with 6ml of N-hydrochloric acid and 1.24ml of a 10% sodium nitrite solution. The batch is kept for 15 minutes at −13°C, and the azide is then precipitated with 80ml of a 20% sodium chloride solution previously cooled to −10°C; it is obtained as a floccular precipitate which is filtered off, washed on the filter at 0°C with sodium bicarbonate solution and then with water and, while still moist, immediately combined with a solution cooled to 0°C of 3.5g of H-Glu(OtBu)-His-Phe-Arg-Try-Gly-Lys(BOC)-Pro-Val-Gly-Lys(BOC)-Lys(BOC)-Arg-Arg-Pro-Val-Lys(BOC)-Val-Tyr-Pro-OtBu tetraacetate and 0.185ml of triethylamine in 15ml of dimethylformamide. The mixture is kept overnight at 0°C and then for 4 hours at 25°C, concentrated to half its volume, and the reaction product is precipitated with 100ml of benzene; it is filtered off, washed with benzene and dried. For preliminary purification it is dissolved in warm methanol and precipitated with ethyl acetate, to yield 3.58g of crude, protected tetracosapeptide ester as an amorphous powder melting at about 195°C with decomposition, which still contains unreacted eicosapeptide derivative as the main contaminant.

For purification 700mg of the crude tetracosapeptide derivative are subjected to a Craig distribution in the solvent system methanol + buffer + chloroform + carbon tetrachloride (32 : 16 : 20 : 9) [buffer = 28.5ml of glacial acetic acid + 19.25g of ammonium acetate in 960ml of water] over 300 steps with phase volumes of 10ml each. Evaporation of the total content of distribution fractions 69 to 92 ($r_{max}$ = 80; K = 0.36) to dryness and removal of the ammonium acetate by sublimation in a high vacuum yields the chromatographically unitary, protected tetracosapeptide ester acetate as an amorphous powder melting at about 220°C with decomposition; it reveals the following $R_f$ values in the thin-layer chromatogram:

on silica gel: $R_f$ (43C) = 0.28
$R_f$ (52) = 0.18
on alumina: $R_f$ (100) = 0.40.

10. H-Gly-Tyr-Gly-Met-Glu-His-Phe-Arg-Try-Gly-Lys-Pro-Val-Gly-Lys-Lys-Arg-Arg-Pro-Val-Lys-Val-Tyr-Pro-OH (Gly$^{1,3}$-$\beta^{1-24}$-Corticotropin)

A solution of 100mg of protected tetracosapeptide ester acetate in 2ml of 90% trifluoroacetic acid is kept for 30 minutes at room temperature, then diluted with 10ml of water, concentrated to about 1ml and lyophilized, to yield the trifluoroacetate of the free tetracosapeptide which is converted into the acetate by being dissolved in 1ml of water and filtered through a column (diameter 7.5mm, height 10cm) of weakly basic ion exchange resin (e.g., Merck No. 11) in the acetate form. The eluate is concentrated to about 0.5ml, lyophilized and dried further in a high vacuum at 40°C, to yield 90mg of chromatographically unitary hexaacetate of Gly$^{1,3}$-$\beta^{1-24}$-corticotropin as an amorphous powder melting at about 175° to 180°C with decomposition.

In the thin-layer chromatogram on alumina in the system 101 the product reveals an $R_f$ value of 0.55 ($\beta^{1-24}$-corticotropin under identical conditions: 0.51).

In the electrophoresis (16 Volts/cm) the compound travels at pH 6.1 (pyridine acetate buffer) within 2 hours 8.6cm towards the cathode.

EXAMPLE 2

A dry vial is prepared containing the following ingredients:
0.5mg of Gly$^{1,3}$-$\beta^{1-24}$-corticotropin hexaacetate
1.23 mg of ZnSO$_4$.7H$_2$O
1.38 mg of Na$_3$PO$_4$.12H$_2$O and
40.0 mg of mannitol.

Before use the contents of the dry vial is mixed in a solution ampoule with 1ml of distilled water. The resulting suspension has a pH value of 7.6.

EXAMPLE 3

A dry ampoule is prepared containing the following ingredients:
0.5 mg of Gly$^{1,3}$-$\beta^{1-24}$-corticotropin hexaacetate
1.23 mg of ZnSO$_4$.7H$_2$O and
40.0 mg of mannitol
and a solution ampoule in which the solution consists of:
1.38 mg of Na$_3$PO$_4$.12H$_2$O
0.1 mg of Versene – Fe-3 and
distilled water to make 1.0ml.

Before use the contents of the dry ampoule and of the solution ampoule are mixed together. The resulting suspension has a pH of 7.6.

EXAMPLE 4

An aqueous solution of Gly$^{1,3}$-$\beta^{1-24}$-corticotropin hexaacetate is filtered under sterile conditions and mixed with a sterile solution of gelatin containing phenol so that the resulting solution consists of:
0.5 mg of Gly$^{1,3}$-$\beta^{1-24}$-corticotropin hexaacetate
150.0 mg of gelatin
0.5 mg of phenol and distilled water to make 1.0ml.

EXAMPLE 5

An aqueous solution of Gly$^{1,3}$-$\beta^{1-24}$-corticotropin hexaacetate is filtered under sterile conditions, mixed under aseptic conditions with sodium polyphloretine phosphate and sodium chloride, charged into vials and lyophilized so that a dry vial is obtained which contains:
0.5 mg of Gly$^{1,3}$-$\beta^{1-24}$-corticotropin hexaacetate
23.20 mg of sodium polyphloretine phosphate (86.5-%) and
12.28 mg of sodium chloride.

Before use the contents of the dry vial is mixed with 2ml of distilled water in a solution ampoule.

EXAMPLE 6

A suspension is prepared from the following components:
Gly$^{1,3}$-$\beta^{1-24}$-corticotropin hexaacetate 1.0 mg
ZnCl$_2$ 10.5 mg
Na$_2$HPO$_4$ 1.7 mg
benzyl alcohol 17.0 mg
NaCl 2.5 mg
NaOH to attain a pH value of 8.0
Distilled water to make up 2 ml.

EXAMPLE 7

2.0 g of poly-L-glutamic acid having an average molecular weight of about 11,000 are dissolved in about 5.7 ml of 10% sodium hydroxide solution so that the pH of the solution amounts to 7.4. In this solution are dissolved 5.0 mg of gly$^{1,3}$-β$^{1-24}$-corticotropin hexaacetate and 0.2 mg of merthiolate and the solution made up to 10 ml with distilled water. The solution is filtered under sterile conditions. It contains per ml:

gly$^{1,3}$-β$^{1-24}$-corticotropin   0.5 mg
poly-L-glutamic acid   200.0 mg
sodium hydroxide solution up to pH 7.4
merthiolate   0.02 mg
distilled water to make up   1.0 ml.

We claim:

1. A member selected from the group consisting of (a) Gly$^3$-β$^{1-n}$-corticotropin, wherein n is an integer from 18 to 39, inclusive, and (b) a peptide of (a) in which at least one of the amino acids in the 1-, 4-, 5-, 17-, 18- and 25-positions are exchanged for other α-amino acids, the amino acid in position 1 being a member selected from the group consisting of L-serine and glycine, the amino acid in position 4 being a member selected from the group consisting of L-methionine, L-norvaline, L-norleucine, L-leucine and L-α-aminobutyric acid, the amino acid in position 5 being a member selected from the group consisting of L-glutamic acid and L-glutamine, the amino acid in positions 17 and 18 being a member selected from the group consisting of L-arginine, L-ornithine and L-lysine and the amino acid in position 25 being a member selected from the group consisting of L-aspartic acid and L-valine, its therapeutically acceptable acid addition salts, N-unsubstituted C-terminal amides and complexes imparting a prolonged activity and formed from the peptide and a member selected from the group consisting of zinc hydroxide, zinc phosphate, zinc pyrophosphate, gelatine and polyphloretinphosphate.

2. Compounds as claimed in claim 1 which compounds are Gly$^{1,3}$-β$^{1-n}$-corticotropin in which n is 18 to 31 inclusive.

3. Compounds as claimed in claim 1 which compounds are selected from the group consisting of (a) Gly$^3$-β$^{1-n}$-corticotropin, wherein n is an integer from 20 to 25, inclusive, and (b) a peptide of (a) in which the L-arginine$^{17,18}$-residues are replaced by L-ornithine residues and (c) a peptide of (a) in which the L-arginine$^{17,18}$-residues are replaced by L-lysine residues and (d) a peptide of (a), (b) or (c) in which the L-glutamyl$^5$-residue is replaced by L-glutaminyl.

4. Compounds as claimed in claim 1 which compounds are selected from the group consisting of the tetracosapeptide of the formula glycyl-L-tyrosyl-glycyl-L-methionyl-L-glutamyl-L-histidyl-L-phenylalanyl-L-arginyl-L-tryptophyl-glycyl L-lysyl-L-prolyl-L-valyl-glycyl-L-lysyl-L-lysyl-L-arginyl-L-arginyl-L-prolyl-L-valyl-L-lysyl-L-valyl-L-tyrosyl-L-proline and the corresponding peptide which contains in 5-position the L-glutaminyl residue.

5. Compounds as claimed in claim 1 which compounds are selected from the group consisting of the tetracosapeptide of the formula glycyl-L-tyrosyl-glycyl-L-methionyl-L-glutamyl-L-histidyl-L-phenylalanyl-L-arginyl-L-tryptophyl-glycyl-L-lysyl-L-prolyl-L-valyl-glycyl-L-lysyl-L-lysyl-L-lysyl-L-lysyl-L-prolyl-L-valyl-L-lysyl-L-valyl-L-tyrosyl-L-proline and the corresponding peptide which contains in 5-position the L-glutaminyl residue.

6. Compounds as claimed in claim 1 which compounds are selected from the group consisting of the tetracosapeptide of the formula glycyl-L-tyrosyl-glycyl-L-methionyl-L-glutamyl-L-histidyl-L-phenylalanyl-L-arginyl-L-tryptophyl-glycyl-L-lysyl-L-propyl-L-valyl-glycyl-L-lysyl-L-lysyl-L-ornithyl-L-ornithyl-L-propyl-L-valyl-L-lysyl-L-valyl-L-tyrosyl-L-proline and the corresponding peptide which contains in 5-position the L-glutaminyl residue.

7. Complexes as claimed in claim 1 which are formed from the peptide and a member selected from the group consisting of zinc hydroxide, zinc phosphate, and zinc pyrophosphate.

8. Complexes as claimed in claim 1 which are formed from the peptide and a member selected from the group consisting of gelatine and polyphloretinphosphate.

* * * * *

PO-1050
(5/69)

UNITED STATES PATENT OFFICE
CERTIFICATE OF CORRECTION

Patent No. 3,755,286    Dated  August 28, 1973

Inventor(s)  BERNHARD RINIKER ET AL

It is certified that error appears in the above-identified patent and that said Letters Patent are hereby corrected as shown below:

Column 1, [73] should read

CIBA-GEIGY Corporation

Signed and sealed this 16th day of April 1974.

(SEAL)
Attest:

EDWARD M. FLETCHER, JR.
Attesting Officer

C. MARSHALL DANN
Commissioner of Patents